United States Patent [19]

Deaton, Jr. et al.

[11] Patent Number: 5,245,608
[45] Date of Patent: Sep. 14, 1993

[54] LOGICAL GROUPING OF LAYER ENTITIES IN A LAYERED COMMUNICATION ARCHITECTURE

[75] Inventors: George A. Deaton, Jr., Raleigh; Vicki G. Horton, Rougemont, both of N.C.; Yves J. Huchet, Nice, France; Jeffrey J. Lynch, Apex, N.C.; Claude R. Pond, Ontario, Canada; Ralph J. Potok, II, Cary, N.C.; James H. Ragsdale, Raleigh, N.C.; Arthur J. Stagg; Robert M. Teague, both of Raleigh, N.C.; Charles E. Williford, Durham, N.C.

[73] Assignee: International Business Machines Corporation, Armonk, N.Y.

[21] Appl. No.: 588,214

[22] Filed: Sep. 26, 1990

[51] Int. Cl.$^5$ .................. H04J 3/00; G06F 13/00; G06F 3/00

[52] U.S. Cl. ........................... 370/94.1; 395/325; 395/725

[58] Field of Search ............... 370/60, 94.1, 99, 110.1; 364/200 MS File, 900 MS File; 395/325, 725

[56] References Cited

U.S. PATENT DOCUMENTS

| | | | |
|---|---|---|---|
| 4,991,133 | 2/1991 | Davis et al. | 370/94.1 |
| 5,012,470 | 4/1991 | Shobu et al. | 370/94.1 |
| 5,124,984 | 6/1992 | Engel | 370/94.1 |

OTHER PUBLICATIONS

Green, Jr., "Protocol Conversion", IEEE Transactions on Communications, vol. COM-34, No. 3, Mar. 1986, pp. 257-268.

Primary Examiner—Douglas W. Olms
Assistant Examiner—Alpus H. Hsu
Attorney, Agent, or Firm—Jerry W. Herndon

[57] ABSTRACT

A method and arrangement for providing a layered communications environment for the routing of information blocks between layers to layer entities forming a logical group based on information block type and the function provided by the individual entities of the group. When an access point (AP) between layers, is first activated, it is given a group classification. As other APs between the layers are activated, they too are given group classifications. All APs between the layers having the same group classification are considered to form a single logical grouping of APs. Each of these APs can be attached to different entities in the adjacent upper layer. This logical grouping allows for information block routing from a lower layer to the adjacent upper layer based on both logical group and block type. The entities in the upper layer that are within one logical group may include separate entities for control and management functions and separate entities for data transport purposes.

26 Claims, 10 Drawing Sheets

LOGICAL GROUPING OF LAYER ENTITIES IN A LAYERED COMMUNICATION ARCHITECTURE

TECHNICAL FIELD

The invention relates to the field of data communications in general and, in particular, to enhancements of layered protocol architectures, such as the Open System Interconnection (OSI) standard, for communication between data processing or end points and between layers within a node.

BACKGROUND OF THE INVENTION

Many communication architectures follow a layered model in which the lowest layer deals with physical transmission media and progressively higher layers perform higher level communication services until, at a selected intermediate or the highest layer, communication with some final process or user is achieved. At a processing node, the layered approach isolates the functions performed in one layer from the details of operation required to perform the functions of the lower layers. Between data processing nodes, functions at the same layers are considered to be peer functions that interact with each other during communication using the layered protocols. At a single node, processes in one layer obtain services from processes in the adjacent lower layer.

The Open Systems Interconnection (OSI) standard is one such layered architecture. A description of the OSI model is set forth in ISO International Standard 7498, Information Processing Systems—Open Systems Interconnection—Basic Reference Model, First Edition—1984-10-15.

In layered architectures such as the OSI model, a service user in one layer is associated with a service provided in the adjacent lower layer by some addressing facility. In OSI, this addressing facility is known as a Service Access Point (SAP). OSI refers to the things in a layer receiving services or giving service as entities. An entity may be a single process, a group of logically related processes, etc. We will adopt this term here as it is used in OSI.

A provider entity in layer n may be attached to one or more SAPs which are attached to the same or different n+1 layer user entities. The provider in a given layer, for example, may route incoming blocks of information from lower layers to an appropriate entity in the next higher layer for which the information blocks are intended. We will refer to such information blocks as protocol information blocks (PIBs). The term "protocol" indicates that such a block is received over a communications medium such as 104. PIBs may be further classified as protocol control blocks (PCBs) and protocol data blocks (PDBs). PBDs contain the transport data that is to be delivered to a data using entity. PCBs, on the other hand, contain control information, such as information used for the setup and teardown of a connection.

In OSI, the routing of PIBs between layers is accomplished by means of a SAP identification (SAP.ID) including in each PIB header. A PIB is sent to the identified SAP.ID and thus to the next layer entity which is also attached to the SAP. Therefore, an entity in layer n is able to route PIBs to layer n+1 entities based on the SAP.ID contained in each PIB. However, the server entity is unable to distinguish and route PIBs based on their type (e.g., PCBs or PDBs). Since all PIBs destined for a SAP. regardless of type, are routed to the same entity in the next upper layer, this means that the final user entity in the layered architecture that receives the PIB must have the capability of dealing with all types of PIBs relevant to the communication function being implemented. Thus, for example, a final user entity must have the functionality to process both PCBs (connection establishment, XID exchanges, error blocks, etc,) and PBDs. XID stands for Exchange Identification. XID exchanges are defined as part of the System Network Architecture (SNA) standards, as well as by the OSI and other protocol standards. The purpose of an XID exchange, among other things, is initially to identify the end points and the parameters to be used in subsequent communication over a connection. The requirement that a final user entity have the capability to deal with all types of PIB exchanges that might occur on a given data connection is inefficient and inflexible for many environments.

SUMMARY OF THE INVENTION

The invention solves this problem in a way that still conforms to the OSI standard, as an example, and in so doing offers a more powerful and flexible layered communications environment. Because our service access points are different from those defined by OSI, for example, we will refer to them merely as access points (APs). When an AP between layers, say layer n and layer n+1, is first activated, it is given a group classification. As other APs between the layers are activated, they too are given group classifications. All APs between the layers having the same group classification are considered to form a single logical grouping of APs. Since each of these APs can be attached to different entities in the adjacent upper layer, this logical grouping allows for the routing of PIBs or other messages derived from PIBs from a lower layer to the adjacent upper layer based on both on logical group and PIB type. For example, the entities in the upper layer that are within one logical group may include separate entities for control and management functions and separate entities for data transport purposes. A single smart PCB entity, for example, in an upper layer could service XID type PCBs for different data user entities. One data user entity might process OSI data, while another might process SNA data, and so on.

Thus, there is provided a system and method arranged for providing communication services by means of a layered communication architecture and in which service provider entities may route PIBs based both on group and PIB type. This means that provider entities in layer n may be attached to PIB APs for the routing of PIBs to entities in the adjacent upper layer n+1. Additionally, the layer n+1 entities may be logically grouped for the purpose of routing PIBs from layer n to individual entities in layer n+1 within a group based on the type of information contained in the PIBs. To achieve this routing flexibility, a plurality of PIB APs are activated between an entity in layer n and a plurality of entities in layer n+1. A group classification is assigned to each AP at the time of activation. Each unique group classification forms a logical grouping of layer n+1 entities. The type of PIB that is processed by the layer n+1 entity associated with each AP is identified at the time of activation. Upon the receipt of each PIB for routing upward in the layered architecture by the layer n entity, the logical group for which the PIB is intended and the type of information contained in the PIB is determined form the PIB. The PIB is then routed to the particular AP associated with a layer n+1 entity that belongs to the identified logical group and which processes the identified PIB type.

Illustratively, the PIB types are divided into protocol control blocks (PCBs) and protocol data blocks (PDBs). Specifically, the PCBs may be used for controlling the setup and teardown of communication sessions between this system and remote systems and for other types of control functions. Therefore, PCBs are routed to a layer n+1 entity that performs control functions and PDBs are routed to a layer n+1 entity that provides data transport functions. In the preferred embodiment, activation of an AP is accomplished by sending a group activate message to each layer n+1 entity that is to be a member of a logical group. In response to the receipt of each group activate message, an activate AP message is generated which includes an identification of the AP and an indication of the function performed by the layer n+1 entity generating the message. The activate AP message is sent to the appropriate entity in layer n. In response to an activate AP message, the layer n entity is lined to the AP and a confirm message is sent to the layer n+1 entity that generated the activate AP message, thereby linking the layer n and the layer n+1 entities via the AP. An indication of the logical group to which a layer n+1 entity is to belong is included in each activate AP message. In the preferred embodiment, this indication is an AP identifier which inherently identifies the group of which the AP is a member. However, there may be many arrangements of information contained in PIBs that also identify, implicitly or explicitly, a logical group of entities in a layer of the architecture. For example, such information might be an explicit group number, if desired in an implementation of the invention other than the preferred embodiment. An AP control block is created in memory in response to each activate AP message by the layer n entity. The AP identification (AP.ID), group and layer n+1 entity type sending the activate AP message is stored in the AP control block. When all activate AP messages for a group have been received by the layer n entity, all AP control blocks in memory that belong to the group are linked together in some appropriate manner. In the preferred embodiment, this is done by storing cross referencing pointers in each of the AP control blocks in a group to the other AP control blocks in the group. In existing layer architecture standards, such as OSI, all PIBs incoming to layer n contain a SAP. In the invention, this access point identification is selected always to be a predefined one of the layer n+1 entities in a group. In the preferred embodiment, this predefined access point is the one associated with the data user entity, i.e. the entity provided to process raw transport data, in layer n+1.

BRIEF DESCRIPTION OF THE DRAWING

In the drawing,

FIG. 4 consists of FIGS. 4A and 4B shows illustrative steps performed in a layer n in response to messages initiated by the steps of FIG. 3 to link entities in layer n+1 to an entity in layer n for the routing of information PIBs;

FIG. 5 consists of FIGS. 5A and 5B shows illustrative steps performed at each layer after the creation of a logical group in layer n+1 for the actual routing of information upward between the layers;

FIG. 8 shows one illustrative format of a control block associated with a service access point.

DETAILED DESCRIPTION

Figure 1:
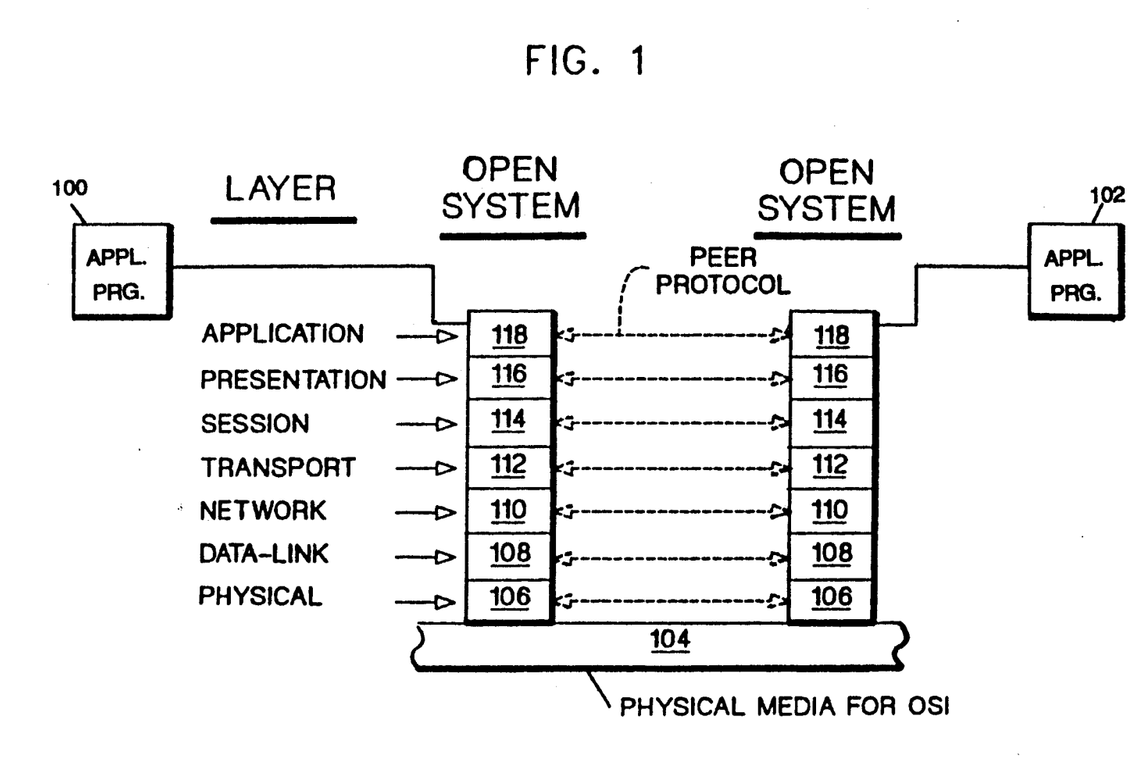
FIG. 1 shows the layered model of the OSI (Open Systems Interconnect) standard.

The OSI model is shown in FIG. 1. In theory it is possible to replace the functionality of any of the layers with equivalent functionality implemented in a different manner and all of the other layers will still operate properly in the system. The communication between one application such as a software module or device, 100, and another module or device 102 over a communication medium such as the cable 104 is described on the basis of seven layers, each of which performs certain functions within the communication protocol. The lowest layer is the physical layer 106.

The physical layer 106 involves the actual connections and the signaling to the communication medium 104. The next layer up is the data link layer 108. This is the layer in which the physical delivery of raw data between nodes on the network is accomplished. The physical signaling protocol, including link information, synchronization information, error correction information, PIB sizes, framing, etc. are conducted at this layer. In most networks, fundamental communication errors are detected and corrected here by retransmission or other means. Communication between a pair of nodes on the network depends on compatible implementation of data link layers. In summary, the link layer establishes, maintains and releases data links and is used for error detection and physical flow control.

The third layer is the network layer 110. This layer controls the routing of information through the network, including addressing, network initialization, and the switching, segmenting and formatting of the information. Sometimes acknowledgement of raw delivery data is accomplished at the network layer, and sometimes it is accomplished at the data link layer.

The next layer is the transport layer 112. This layer controls transparent data transfer, end-to-end control, multiplexing, mapping and the like. Data delivery may imply reliable delivery, as opposed to a best effort to deliver the data which must be accounted for in the layers below the transport layer. Other classes of reliability may be selected as options as well. For example, at the transport layer, for reliability class 0, it is assumed that the data has been communicated in a reliable manner, and such things as the retransmission of missing data, reordering of the data delivered out of order, recovery from transmission errors, etc. has been corrected at or below the transport layer.

The fifth layer is the session layer 114. The session layer 114 utilizes the information from the transport layer to group pieces of data as associated with a given activity referred to as a session. Sessions occur between two entities at various locations on the network. At a given time, single nodes on the network may be involved in multiple sessions going to a plurality of other nodes, and many sessions may be multiplexed over the same network. However, the session layer services provide for the end-to-end delivery of data associated with a given logical activity without interference by data from other activities.

Layer six is the presentation layer 116. The presentation layer 116 relates to the interface between the session layer 114 and the application layer 118 at layer seven. The application layer 118 is where the actual data is applied to or received from the software module or device (100 or 102) at each end of the communication. The presentation layer 116 presents the data in an acceptable form suitable for use in the application layer 118 without having to compromise the network related integrity of the session layer 114. The presentation layer 116 therefore relates to data interpretation, format and code transformation, while the application layer relates to user application entities and management functions.

Figure 2:
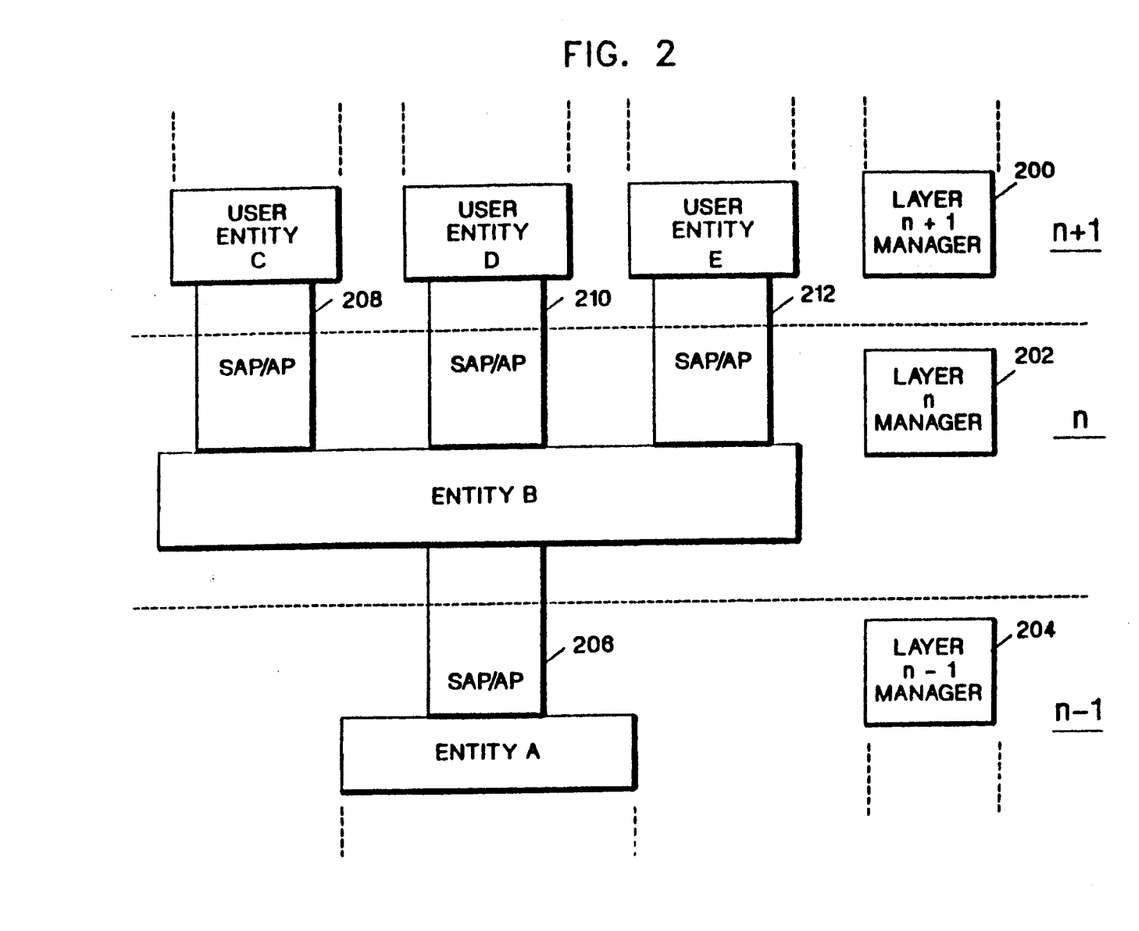
FIG. 2 shows one example of the interconnection of entities in different layers of a communications environment by service access points (APs)

Without getting too bogged-down in the official semantics of the OSI standard, the standard defines an entity as an active element in a layer that interacts with other entities in the adjacent upper or lower layers. An element, and therefore an entity, may be thought of as a process for the purposes of this discussion, although the OSI standard defines entity more generally, as mentioned earlier. FIG. 2 conceptually illustrates one relationship between entities in layers n−1, n and n+1 in accordance with the OSI standard. In general, there are management functions associated with each layer. In FIG. 2, it is assumed that such management functions are the responsibility of layer managers 200, 202 and 204. One scenario of the illustrative relationship of FIG. 2 is that PIBs incoming to entity A in layer n−1 are to be routed to provider entity B in layer n, which in turn routes the PIBs to appropriate final user entities C, D or E in layer n+1. In this particular example, entity A is linked to entity B by a service access point (SAP)206. As an aside, when we are referring to FIG. 2 in OSI terms, the access points such as 208 are called SAPs in accordance with the OSI terminology. However, in the instances in which we refer to FIG. 2 in the terms of the invention, we call these same routing conduits access points, or APs, to indicate that they are different from OSI SAPs. Entity A might be linked to SAPs other than B, but that is irrelevant for this discussion. Entity B is linked to entities C, D and E by SAPs 208, 210 and 212, respectively. On receipt of a PIB by entity A, the entity strips and examines header information relevant to its layer from the PIB and routes the remaining part of the PIB to entity B in layer n. The SAP 206 linking A to B is identified by the header information that entity B strips and examines. Entity B further strips header information and routes the remaining part of the PIB to the appropriate n+1 entity (C, D or E) identified by the header information that it strips and examines. Entities C through E could be, for example, network layer processes for handling different types of protocols such as SNA, X.25 and CLNP (Connectionless Network Protocol) PIBs, respectively. Assuming for the moment that entities C through E reside in the network layer 110, under existing OSI standards the entities C through E would have to be capable of processing any type of PIB at the network layer (protocol control PCBs, raw transport data PDBs or otherwise) that might possibly be routed to it based on SAP identification above. For example, if entity C processes SNA protocol PCBs, it must handle XID types of exchanges in this protocol, as well as user data, error logging, etc. The same is true for the other entities D and E.

The invention enhances layered models, such as the OSI model above, in ways that still conform to the standard, but which allow entities such as C, D and E to be related as members of a logical group which are individually selectable by the provider entity B based on incoming PIB type and group. This individual selectivity allows a more granular entity to entity association than is provided by other standards, such as the OSI SAP. It is applicable to communication between entities in any adjacent layers of the layered architecture. However, the specific embodiment disclosed here is for communication between entities in the physical layer (n−1), the data-link layer (n) and the network layer (n+1). With reference to FIG. 2 again, the Layer Control Entity 200 initiates the creation of a group of related user entities in its layer when desired. This might occur during initial system startup, or upon some other type of system stimuli. The layer manager 200 is aware of the layer n+1 entities C, D and E which we will assume are to be included in the group. The individual members C, D and E of the group are intended to perform different but related functions and are individually recognizable by the entity B at layer n, based on the type of an incoming PIB directed to the group. For example, we can assume for discussion that entity C is to process SNA XID exchanges entity D is to process user data PDBs in the SNA protocol and entity E performs error handling functions. The layer manager 200 controls the assignment of GROUP identifiers so that different logical groups can exist within a layer at the same time, if desired. The n+1 layer manager is also aware of what n+1 layer functions are required by an entity in layer n. For example, layer manager 200 is aware that entity B requires an XID manager, an error handling entity and at least one user data entity in the n+1 layer. This knowledge can be obtained either by n layer configuration information that is available to the n+1 layer manager or via a prior exchange between the n and n+1 layer managers.

Figure 3:
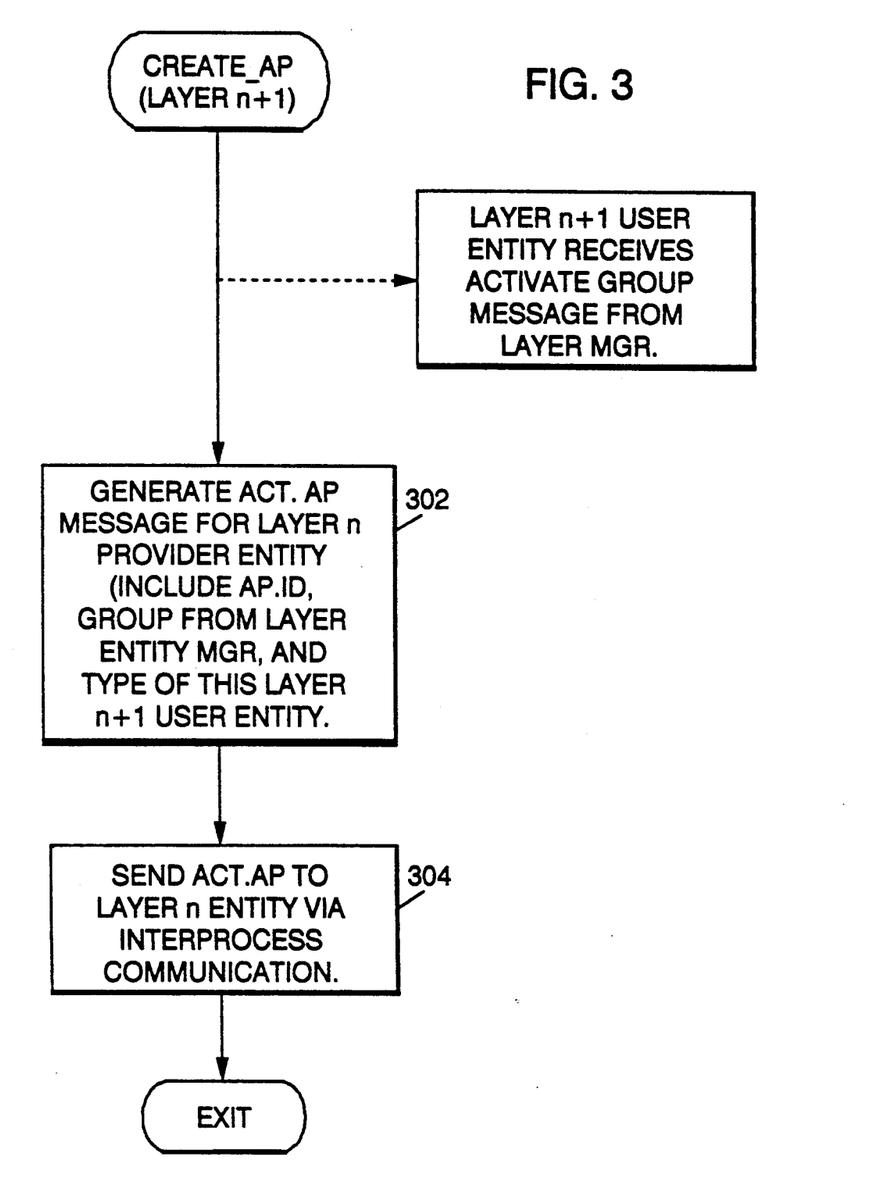
FIG. 3 shows the initial illustrative steps performed in accordance with the invention to initiate the creation of a logical group of layer n+1 entities.
Figures 4, 4A:
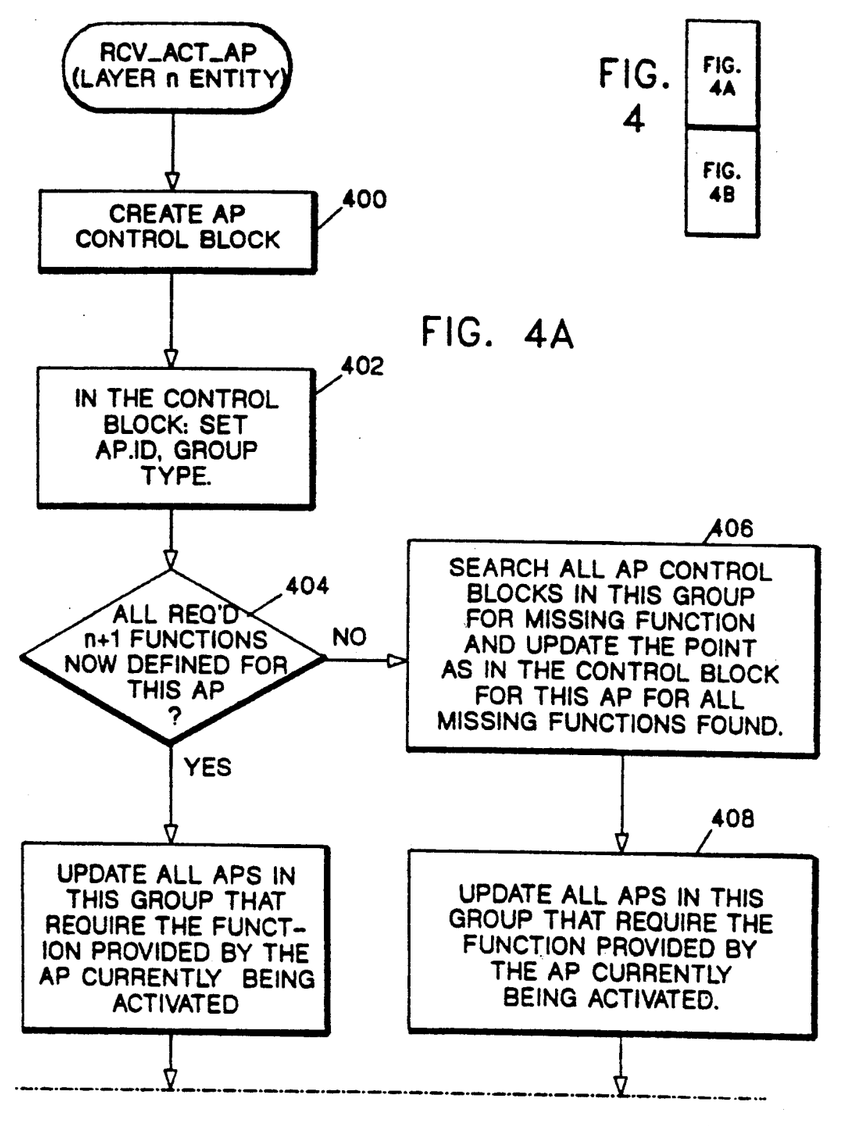
Figure 4B:
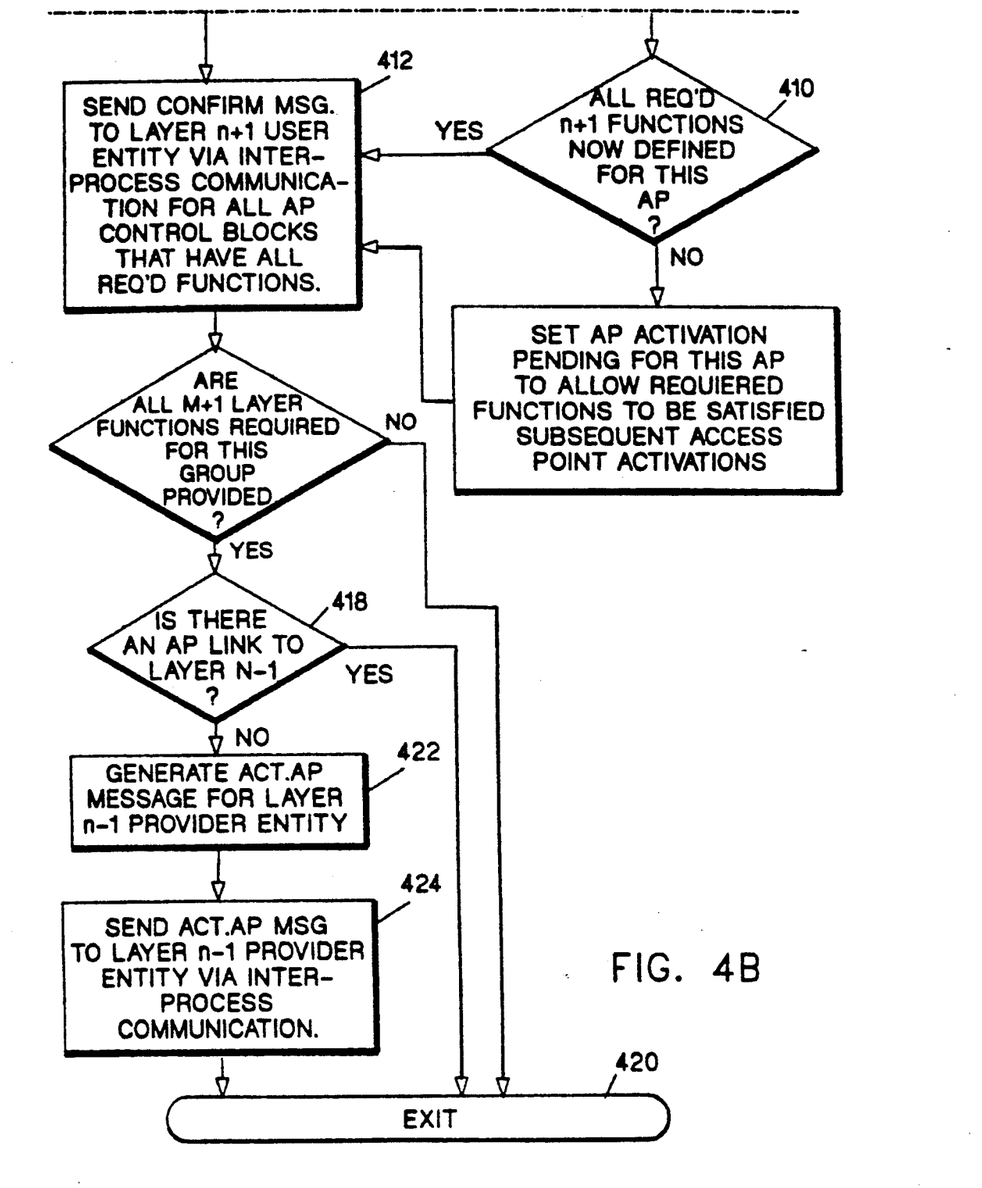
Figures 5, 5A:
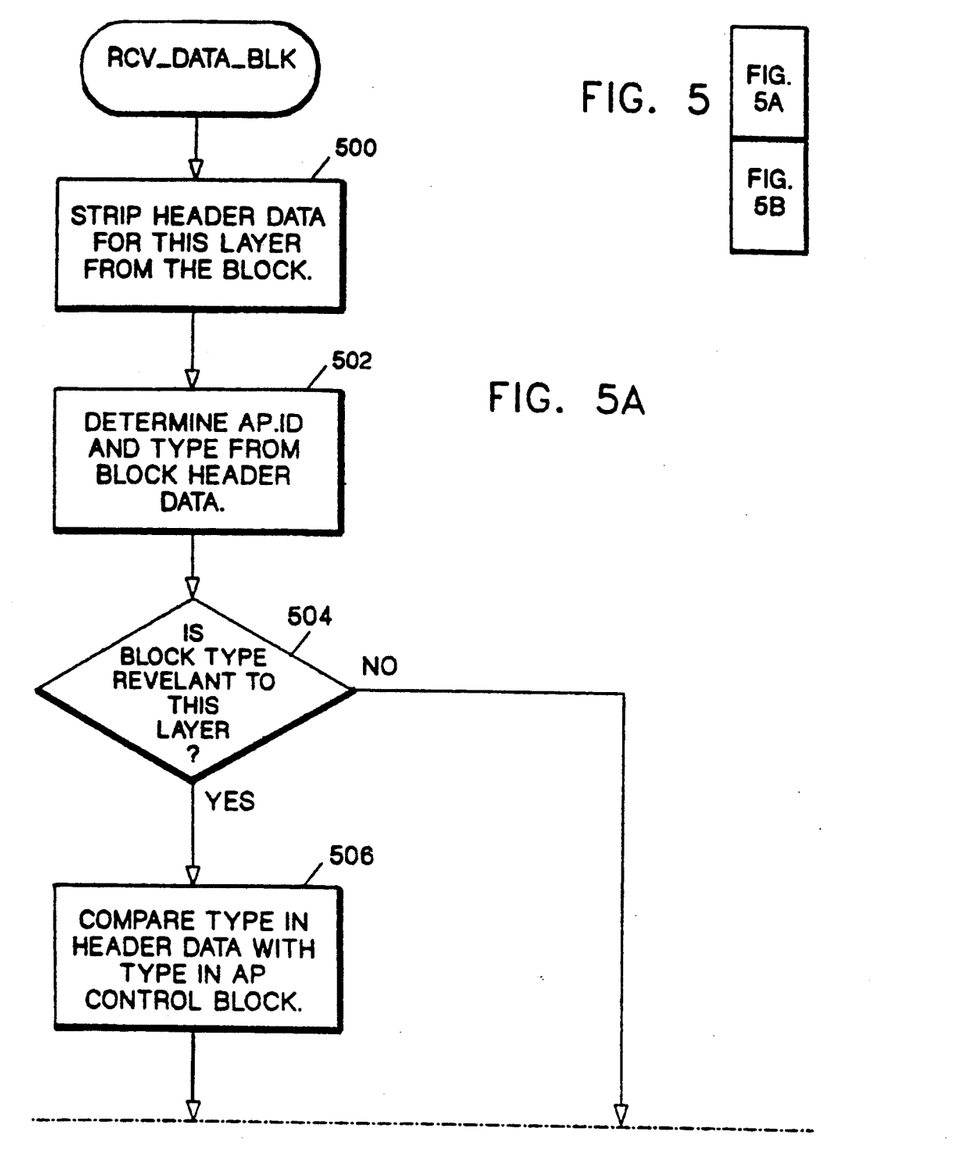
Figure 5B:
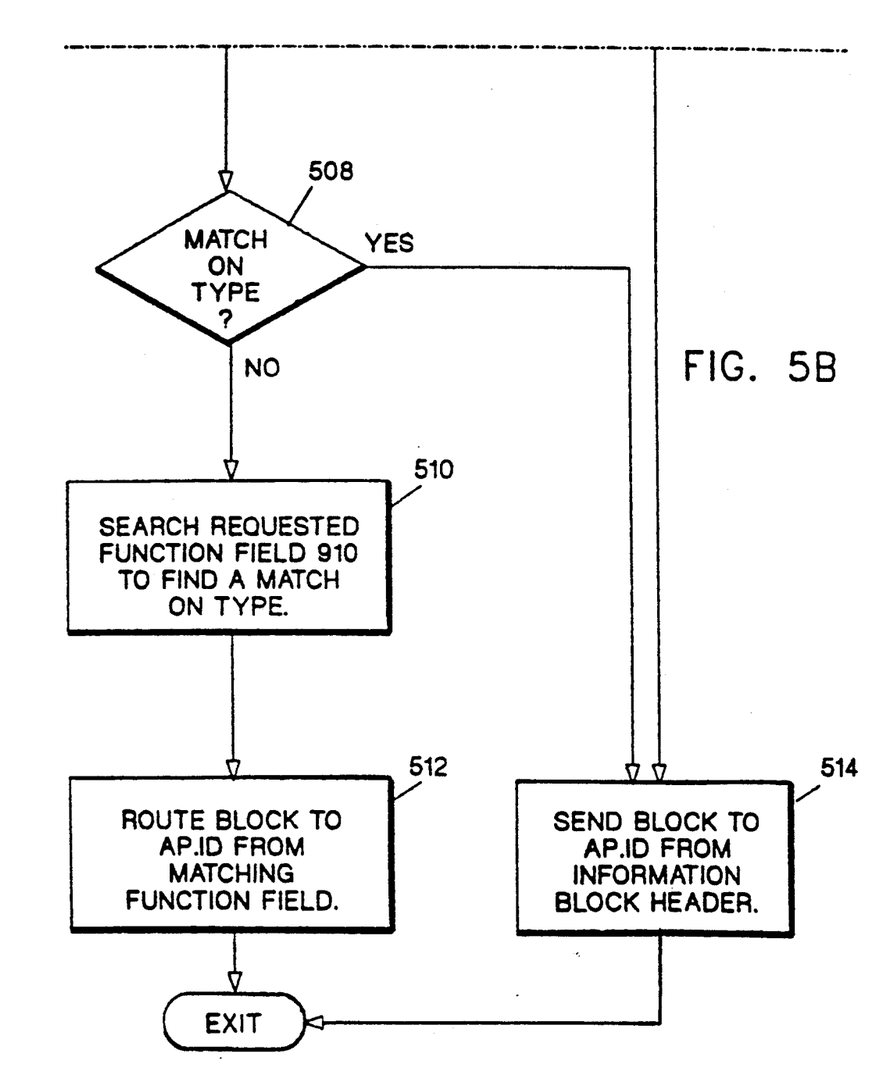

FIGS. 3 and 4 show the method steps that are executed to link entities in adjacent layers via APs and, in doing, to perform the logical grouping of entities in a layer in accordance with the invention. Specifically, FIG. 3 deals with the initial creation of a group in a layer n+1 in response to a request from the layer n+1 layer manager 200. FIG. 4 deals with the resulting AP linkages and typing in layer n. FIG. 5 shows the steps executed to route PIBs upward based on the identity of an AP (AP.ID) and PIB type.

Figure 6:
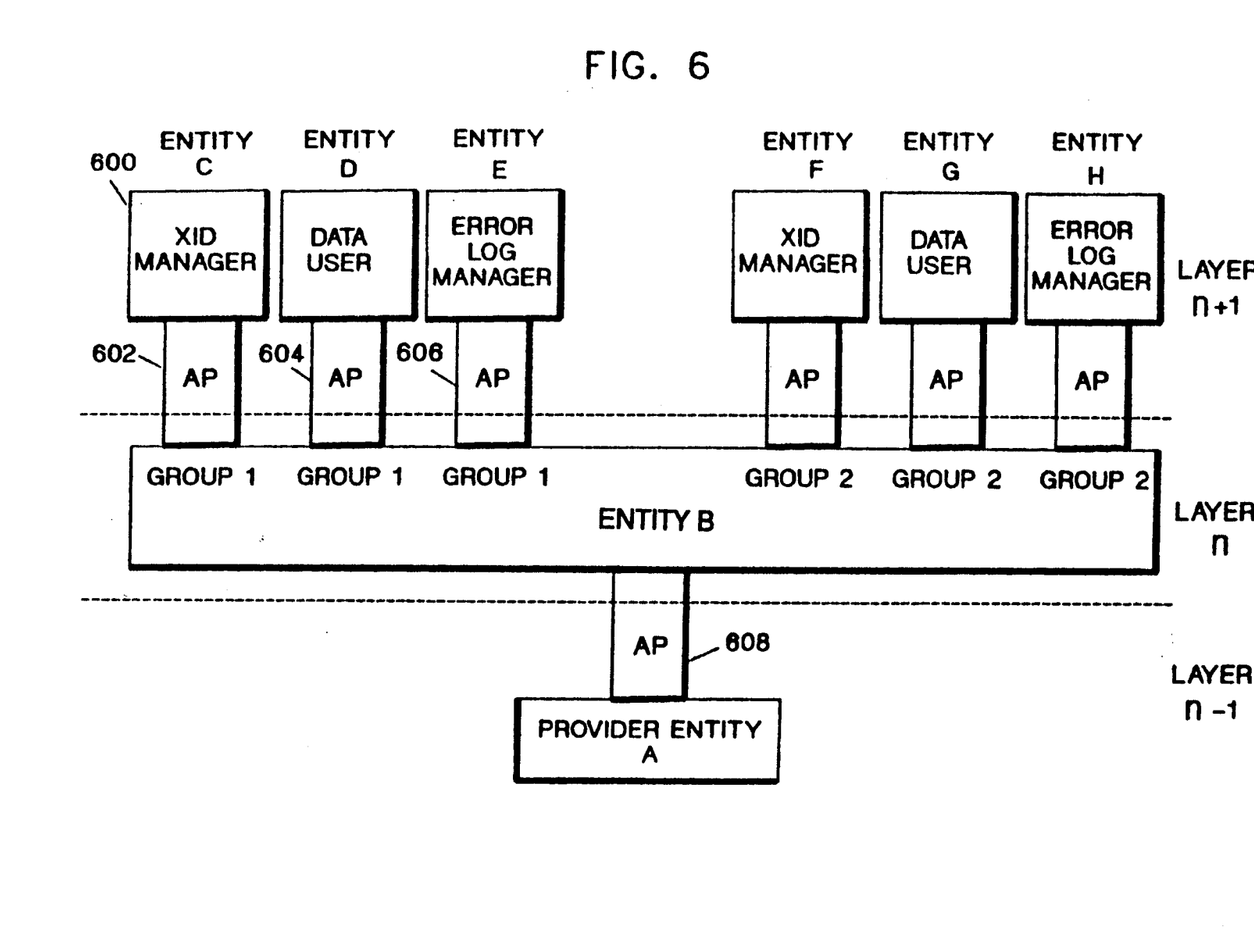
FIG. 6 shows one illustrative example of two groups of entities created in layer n+1 in accordance with the invention.

For purposes of illustration, it is assumed that the illustrative group structure shown in FIG. 6 is to be created. This group structure consists of two groups, 1 and 2, of user entities in layer n+1. Entities C through E are in group 1 and entities F through H are in group 2. It is further assumed that entity C is an SNA XID manager, entity D is a data user entity and entity E is an error processing manager. These functions are illustrative only. Other types of functions could be selected as well. It should be understood that access points can also provide system services that are required by a provider entity. One example of such a service might be the provision of error messages to an entity based on incoming blocks containing invalid data. Such system services can also be grouped by APs in accordance with the invention. Since the steps for creating separate groups are the same, only the creation of group 1 will be described.

Prior to the activation of an AP by a layer n+1 entity, the n+1 layer manager provides the layer n+1 entity with a group number. This can be accomplished either by including the group number in initial system configuration information for the n+1 entity or via separate messages that are transmitted between the n+1 layer manager and the n+1 entity. For example, when it is desired to establish a layered group entity structure, such as group 1 in FIG. 6, the layer manager 200 of the layer containing the grouped entities generates an activate group message. This message is sent to each of the service user entities (C, D and E in this example) of the intended group via an intra-layer communication function. This intra-layer communication function differs according to the particular type of system in which the layered architecture is implemented. The activate group message contains a unique, but otherwise arbitrary, GROUP identifier.

Figure 7:
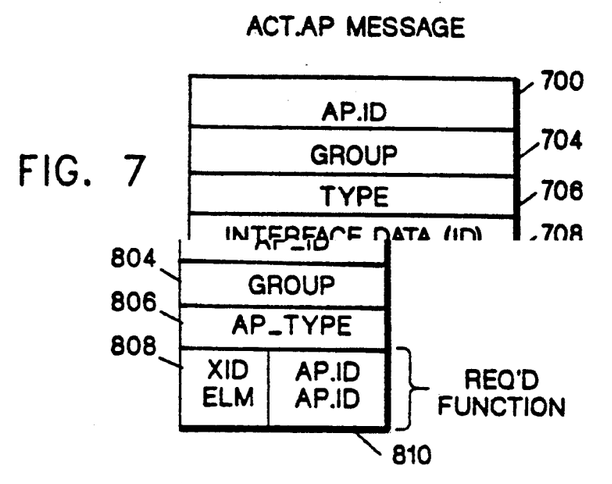
FIG. 7 shows an illustrative format of a message used to activate a service access point between layers.

In response to the activate group message, each service user entity (D, D and E) generates an activate AP (ACT.AP) message. An illustrative format of the ACT.AP massage is shown in FIG. 7. This message contains an AP identifier (AP.ID) in field 700, the GROUP identifier passed by the layer manager 200 in field 704 and a TYPE identifier n field 706 that identifies the particular function provided by the layer n+1 service user entity generating the ACT.AP message. AP.IDs are predefined on the basis of data user types and layer manager functions. The ACT.AP message may also contain other information as well in field 708, but which is irrelevant to an understanding of the invention. Each ACT.AP message is sent to the appropriate layer n entity via interprocess communication provided by the operating system in question. For example, if this layered architecture is operating within a PS/2 (TM), a desktop computer marketed by IBM, the interprocess communication might be the type provided by the well known OS/2 operating system, also marketed by IBM.

FIG. 3 illustrates the above activate AP process. The steps in FIG. 3 are executed by each of the user entities in layer n+1 receiving the activate group message from the n+1 layer manager 200. In other words, each of the user entities C, D and E execute the steps shown in FIG. 3. Step 302 generates an ACT.AP message, which includes the GROUP identifier and the TYPE identification which identifies the type of function performed by the user entity in question. If it is assumed that user entity C is generating its ACT.AP message, the TYPE identification included in the ACT.AP message is XID management. Similarly, user entities D and E include their types (data user and error manager, respectively) in the ACT.AP messages that they generate. Step 304 sends the ACT.AP message in question to the layer n entity (entity B in this example) that is responsible for the routing of PIBs for this group.

FIG. 4 (program RCV_ACT_AP) shows the steps performed by an entity (for example, entity B) on receive of each ACT.AP message. Step 400 creates an AP control block 800 (FIG. 8). The control block contains a field 802 for the AP.ID and additional fields 804 and 806 for the GROUP and TYPE identifications, respectively. The contents of fields 802, 804 and 806 are initialized by step 402. Field 808 contains a listing of the required functions in layer n+1 that a particular AP requires to complete its operations. These required functions can be provided as part of the configuration information that is provided as part of system definitions available on system startup or they may be provided in any other manner desired. For example, a AP connected to a layer n+1 data user (entity D) may require at least that an XID manager and an error logging manager be provided as user entities in layer n+1. An AP connected to an XID manager (entity C) generally will not require any other user entity in layer n+1. Likewise for an error logging manager (entity E). The specific functions in layer n+1 required by an AP in layer n are a matter of predefinition for the system or application at hand and are entered in field 808 when the control block is created. AP.IDs of the APs that are connected to the n+1 layer entities identified in field 808 are entered in field 810 in association with the field 808 entries as the appropriate APs are activated in the group. Step 404 searches the required functions field 808 to determine if a AP entry has been made for each required n+1 layer function in field 808. If there are required functions listed and one or more of them do not yet have entries, then step 406 searches all present AP control blocks to see if an n+1 layer function exists for this group for each missing function listed in field 808. For each AP control block found for this group that is associated with a required function, step 408 updates field 810 with the AP.ID contained in the found AP control block for the required function. Once all existing AP control blocks have been searched, step 410 repeats the determination of whether or not all required n+1 layer functions for this AP have AP.ID entries in field 810. If all are satisfied, step 412 sends a confirm message to the layer n+1 user entity that generated the ACT.AP message that is now being processed. This confirm message also contains the AP.ID of the AP connecting the layer n and layer n+1 user entity. As a result the layer n+1 entity and the layer n entity are effectively linked together via the same AP. This would be AP 602 in the case of user entity C, AP 603 for D and AP 606 for user entity D. If all required layer n functions are not yet provided for this AP, the activation for this AP enters a pending state waiting to be satisfied by subsequent access point activations. All access points that have all of their required functions satisfied are confirmed at this time. The above steps will be repeated again when the next ACT.AP message is received by the layer n entity (B). However, if all functions are now provided for this AP, step 418 determines if a AP to a layer n−1 entity (entity A in this example) already exists. Such a AP link could have been provided at an earlier time in conjunction with the creation of another group of entities in layer n+1. If the AP link to layer n−1 exists, the creation of the group 1 layer n+1 entities is complete and the program exits at step 420. If the link does not exist, step 422 generates a ACT.AP message to create the link and step 424 sends the message to the layer n−1 manager via interprocess communication. The contents of TYPE in this message will be null for this illustrative example, since AP type is not relevant for entity A in this illustrative example. However, it will be clear that TYPE could be included to establish some other type of grouping between the layers.

By way of example, the AP.ID for the data user entity D is used for addressing in all PIBs that are received for this logical group. While this is arbitrary, the use of data user entities such as D for addressing purposes in the PIB headers is more efficient than the use of other n+1 layer entities of the group, since the bulk of all PIBs to the group will ordinarily be to the data user entity.

The above layer linking process is general in that layer n+1, layer n, etc. may refer to any layer of the architecture. However, as mentioned earlier, this illustrative embodiment is concerned only with the first three layers (physical, data link and network).

All the layer linkages are now in place for subsequent communication between other nodes and this group of layer n+1 user entities of the present node. The initiation of communications with another node is done in a conventional way. Thereafter, all communication of PIBs from a remote node to this layer n+1 group is via the AP.ID of the data user entity D, as mentioned above. The program RCV_DATA_BLK in FIG. 5 is executed in each of the layers to achieve such communications. When a PIB arrives at layer n−1, step 500 strips the header information pertinent to this layer from the PIB header. Step 502 determines the AP.ID of the data user entity D from the stripped information. Step 502 also determines the TYPE of the IB by examining the header information. Step 504 determines if the PIB type is relevant at the layer processing the PIB. It does this in the preferred embodiment by examining the TYPE field 806 of the AP control block associated with the layer and AP.ID (the TYPE field in layers where type is not relevant will be set to an "ignore" state). If TYPE is "ignore", then the PIB type for this layer is not relevant. This, in the preferred embodiment, for a PIB arriving an entity A, PIB type is not relevant and step 5414 merely routes the PIB to the AP identified in the PIB header (AP 608). This routes the PIB to entity B in the data link layer. A separate instance of RCV_DATA_BLK is also running at layer n and n+1. When RCV_DATA_BLK at layer n receives the data PIB, step 504 determines that the PIB type is relevant (the TYPE field 506 is not set to "ignore" in layer n). Step 506 determines the type of the PIB by examining the PIB header and compares it with the contents of the TYPE field 806. Remember that the TYPE field 806 in the AP control block in layer n is associated with the data user entity D in layer n+1. If the PIB is a data PIB, i.e., a PDB, the match is successful (step 508) and step 514 routes the PDB to the data user entity via the associated AP 604. If the PIB is not a PDB, steps 506 and 508 do not find a match. In this case, step 510 searches the required function field 810 until it locates a match on TYPE. Step 512 then routes the PIB to the layer n+1 entity linked to the AP.ID that is associated with the found TYPE match.

Figure 9:
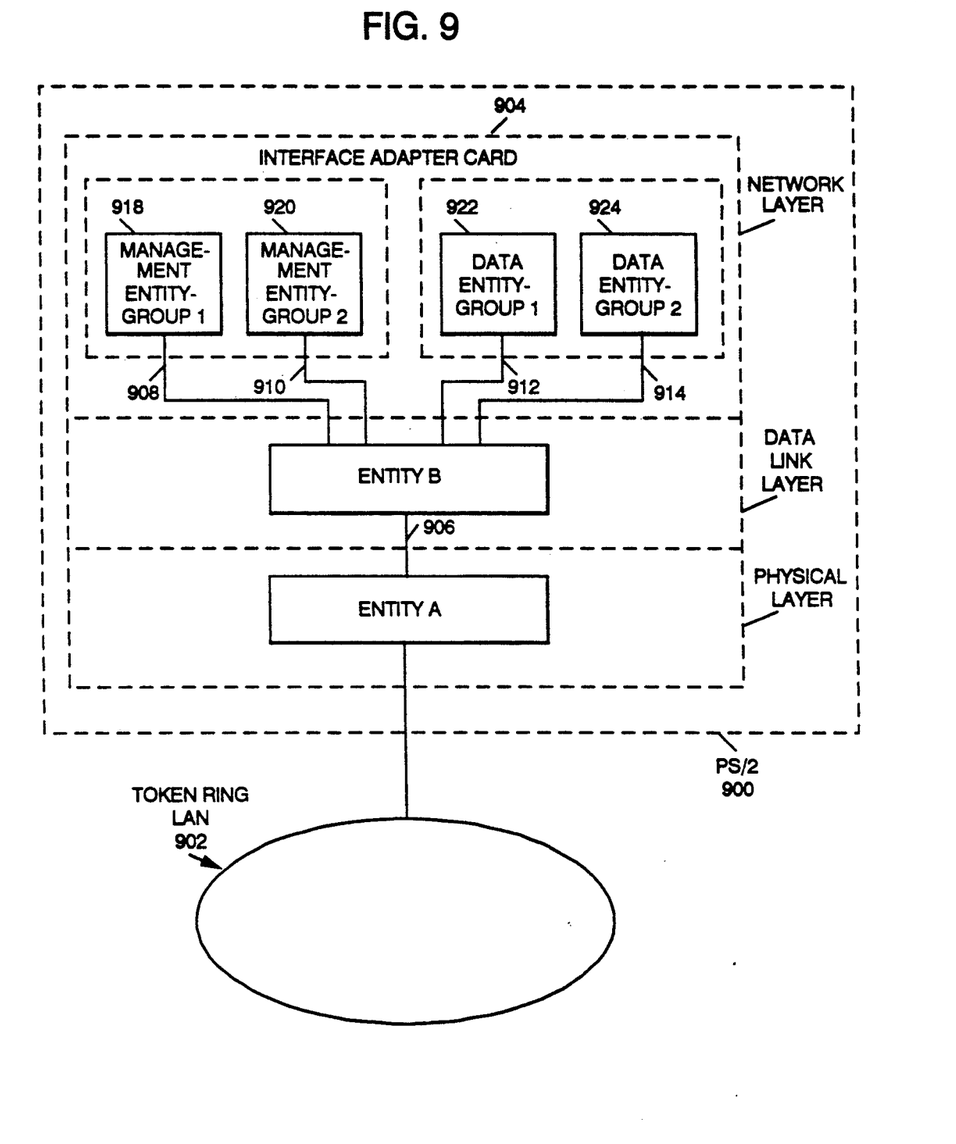
FIG. 9 shows an example of use of the invention in a circuit card inserted in a desktop computer for providing an interface between the computer and a local area network.

FIG. 9 shows one physical embodiment in which the above invention might be used. This particular example involves a desktop computer 900, such as a PS/2, which is interfaced to a local area network (LAN) 902 by means of an interface card 904 inserted into the computer. The LAN might be a token ring network, for example. The card 904 implements a layered communication architecture in accordance with the teaching of the invention. An entity A in the physical layer sends and receives information to and from the LAN 902. Entity A is linked to entity B in the data link control layer by a AP 906. Two logical groups of entities have been created in the network layer to which entity B is linked by APs 908 and 920 in the network layer have been created for the two groups 1 and 2. These two management entities are respectively associated with the user data entities 922 and 924 in the respective groups 1 and 2. Thus, this physical example is similar to the structure shown in FIG. 6. The management entities establish and teardown connections to other nodes on the LAN 902. They may perform other control functions as well. The data user entities receive the data information destined for a higher layer or for user applications (not shown). Usually, but not always, the data user entities link to the next upper transport layer to pass data PDBs on to the data user applications.

It is to be understood that the above described arrangements are merely illustrative of the application of principles of the invention and that other arrangements may be devised by workers skilled in the art without departing from the spirit and scope of the invention.

We claim:

1. In a system arranged for providing communication services by means of a layered communication architecture having a plurality of layers 1 through m, wherein provider entities in layer n, where n equals 1 through m−1, may be attached to information block routing access points for the routing of blocks to entities in the adjacent upper layer n+1, a method of logically grouping some of the entities in layer n+1 with a provider entity in layer n, comprising the steps of
   activating a plurality of block routing access points between an entity in layer n and a plurality of entities in layer n+1,
   assigning a group classification to each access point at the time of activation, wherein each unique group classification forms a logical grouping of layer n+1 entities, and identifying the type of information block that is processed by the layer n+1 entity associated with each access point,
   upon the receipt of each information block for routing upward in the layered architecture by the layer n entity, determining from the block the logical group for which the block is intended and the type of information contained in the block, and
   routing a block or a message derived from a block to the particular access point associated with a layer n+1 entity that belongs to the identified logical group and which processes the identified block type.

2. The method of claim 1 wherein block types are divided into control blocks and data blocks.

3. The method of claim 2 wherein the control blocks include blocks for controlling the setup and teardown of communication connections between this system and remote systems.

4. The method of claim 2 or claim 3 wherein the routing step further comprises routing control blocks to a layer n+1 entity that performs control functions and routing data blocks to a layer n+1 that provides data transport functions.

5. The method of claim 1 wherein the activating step further comprises
   sending a group activate message to each layer n+1 entity that is to be a member of a logical group,
   in response to the receipt of each group activate message, generating an activate access point message including an identification of the access point and an indication of the function performed by the layer n+1 entity generating the message, and
   sending the activate access point message to an entity in layer n.

6. The method of claim 5 further comprising
in response to the receipt of an activate access point message by the layer n entity, linking the layer n entity to the access point, and
sending a confirm message to the layer n+1 entity that generated the activate access point message, thereby linking the layer n and the layer n+1 entities via the access point.

7. The method of claim 6 further comprising including the indication of the logical group in each activate access point message.

8. The method of claim 78 further comprising creating an access point control block in response to the receipt of each activate access point message by the layer n entity, and including the access point identification, group and layer n+1 entity type sending the activate access point message in the control block.

9. The method of claim 8 further comprising determining when all activate access point messages for a group have been received by the layer n entity and linking all control blocks together that belong to the group.

10. The method of claim 9 wherein the linking of control blocks further comprises storing the access point identifications of all remaining access points in the group in association with the control block of a selected one of the control blocks.

11. The method of claim 10 wherein the selected one of the control blocks is the control block associated with the access point linked to the data block entity in layer n+1.

12. The method of claim 11 further comprising generating an activate access point message by the layer n entity, if there is an n−1 layer, and sending the message to an entity in layer n−1 to link the layer n−1 entity with the layer n entity for the routing of information blocks from layer n−1 to layer n.

13. The method of claim 1 wherein the step of determining from the block the logical group for which the block is intended further comprises
obtaining an access point identification from the block,
determining if the entity type in layer n+1 connected to the access point identified from the block matches the block type, and the step of routing further comprises
if the block type matches the entity type, routing the block to the access point identified in the block,
if the block type does not match the entity type, locating another access point in the logical group whose connected entity in layer n+1 matches the block type and routing the block to the corresponding access point.

14. In a system arranged for providing communication services by means of a layered communication architecture having a plurality of layers 1 through m, wherein provider entities in layer n, where n equals 1 through m−1, may be attached to information block routing access points for the routing of blocks to entities in the adjacent upper layer n+1, an arrangement for logically grouping some of the entities in layer n+1 with a provider entity inlayer n, comprising
means for activating a plurality of block routing access points between an entity in layer n and a plurality of entities in layer n+1,
means for assigning a group classification to each access point at the time of activation, wherein each unique group classification forms a logical grouping of layer n+1 entities, and means for identifying the type of information block that is processed by the layer n+1 entity associated with each access point,
upon the receipt of each information block for routing upward in the layered architecture by the layer n entity, means for determining from the block the logical group for which the block is intended and the type of information contained in the block, and
means for routing the block or a message derived from the block to the particular access point associated with a layer n+1 entity that belongs to the identified logical group and which processes the identified block type or the derived message.

15. The arrangement of claim 14 wherein block types are divided into control blocks and data blocks.

16. The arrangement of claim 15 wherein the control blocks includes blocks for controlling the setup and teardown of communication connections between this system and remote systems.

17. The arrangement of claim 15 or 16 wherein the means for routing further comprises means for routing control blocks to a layer n+1 entity that performs control functions and means for routing data blocks to a layer n+1 that provides data transport functions.

18. The arrangement of claim 14 wherein the activating means further comprises
means for sending a group activate message to each layer n+1 entity that is to be a member of a logical group,
means responsive to the receipt of each group activate message for generating an activate access point message including an identification of the access point and an indication of the function performed by the layer n+1 entity generating the message, and
means for sending the activate access point message to an entity in layer n.

19. The arrangement of claim 18 further comprising
means responsive to the receipt of an activate access point message by the layer n entity for linking the layer n entity to the access point, and
mean for sending a confirm message to the layer n+1 entity that generated the activate access point message, thereby linking the layer n and the layer n+1 entities via the access point.

20. The arrangement of claim 19 further comprising means for including the indication of the logical group in each activate access point message.

21. The arrangement of claim 20 further comprising means for generating an access point control block in response to the receipt of each activate access point message by the layer n entity, and means for including the access point identification, group and layer n+1 entity type sending the activate access point message in the control block.

22. The arrangement of claim 21 further comprising means for determining when all activate access point messages for a group have been received by the layer n entity and means for linking all control blocks together that belong to the group.

23. The arrangement of claim 22 wherein the means for linking the control blocks further comprises means for storing the access point identifications of all remaining access points in the group in association with the control block of a selected one of the control blocks.

24. The arrangement of claim 23 wherein the selected one of the control blocks is the control block associated with the access point linked to the data block entity in layer n+1.

25. The arrangement of claim 24 further comprising means for generating an activate access point message by the layer n entity, if there is an n−1 layer, and means for sending the message to an entity in layer n−1 to link the layer n−1 entity with the layer n entity for the routing of information blocks from layer n−1 to layer n.

26. The arrangement of claim 14 wherein the means for determining from the block the logical group for which the block is intended further comprises     means for obtaining an access point identification from the block,     means for determining if the entity type in layer n+1 connected to the access point identified from the block matches the block type, and the means for routing further comprises means responsive to the determining means for routing the block to the access point identified in the block if the block type matches the entity type, means activated by the determining means when the block type does not match the entity type for locating another access point in the logical group whose connected entity in layer n+1 matches the block type, and means for routing the block to the corresponding access point corresponding to the located layer n+1 entity.

* * * * *